Oct. 26, 1954   W. S. PRAEG   2,692,535
AUTOMATIC LOADING FIXTURE
Filed April 12, 1948   4 Sheets-Sheet 1
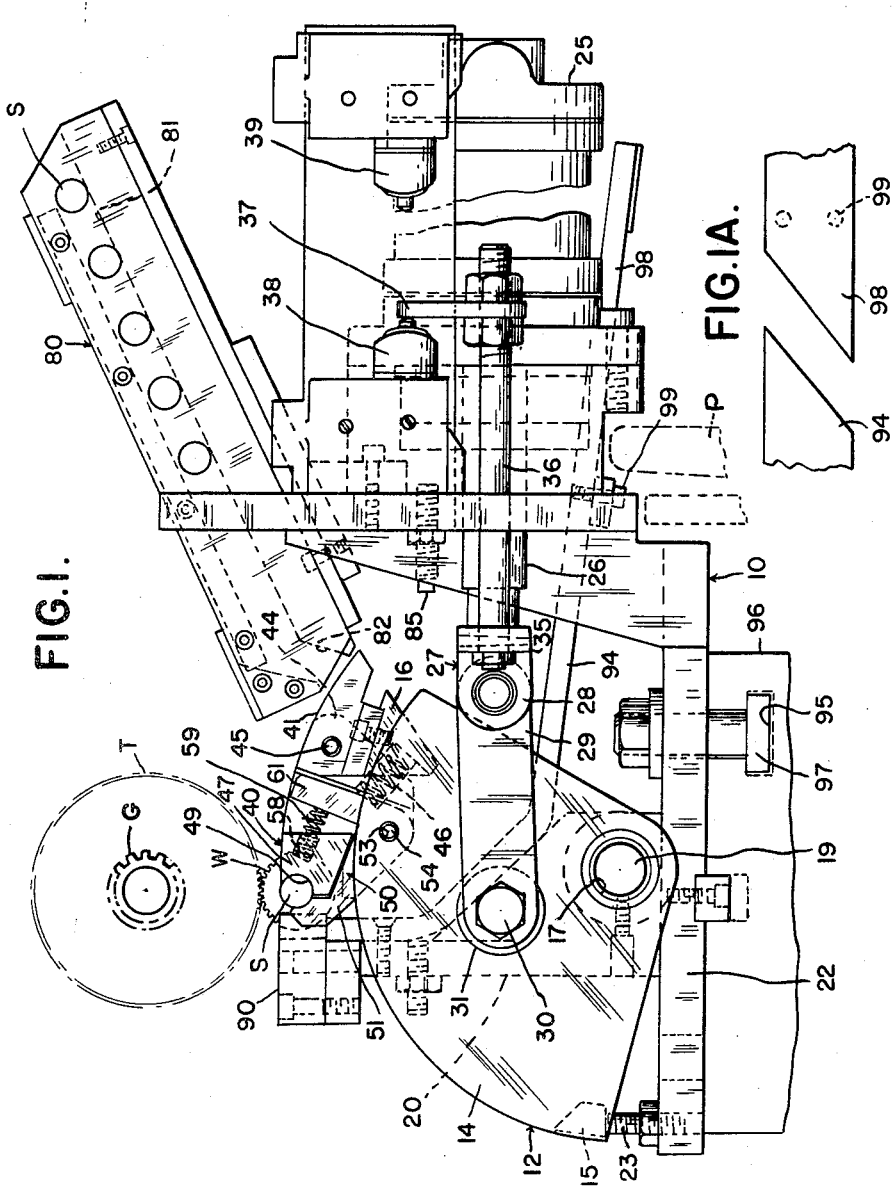
INVENTOR.
WALTER S. PRAEG
BY
Whittemore, Hulbert
& Belknap   ATTORNEYS Oct. 26, 1954
W. S. PRAEG
2,692,535
AUTOMATIC LOADING FIXTURE
Filed April 12, 1948
4 Sheets-Sheet 2
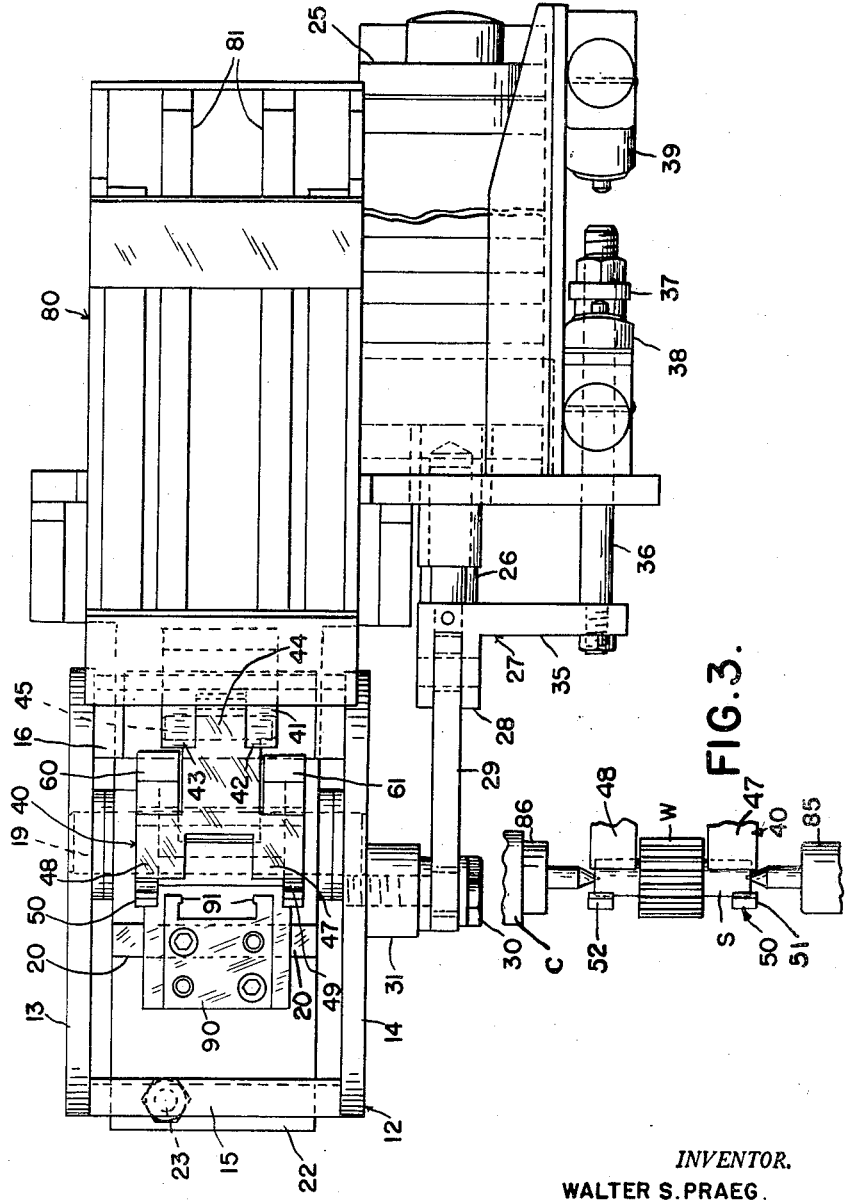
INVENTOR.
WALTER S. PRAEG.
BY
Whittemore, Hulbert
& Belknap ATTORNEYS Oct. 26, 1954     W. S. PRAEG     2,692,535
AUTOMATIC LOADING FIXTURE Filed April 12, 1948     4 Sheets-Sheet 3

*INVENTOR.*
WALTER S. PRAEG

BY Whittemore, Hulbert
& Belknap
ATTORNEYS

Oct. 26, 1954 W. S. PRAEG 2,692,535
AUTOMATIC LOADING FIXTURE
Filed April 12, 1948 4 Sheets-Sheet 4
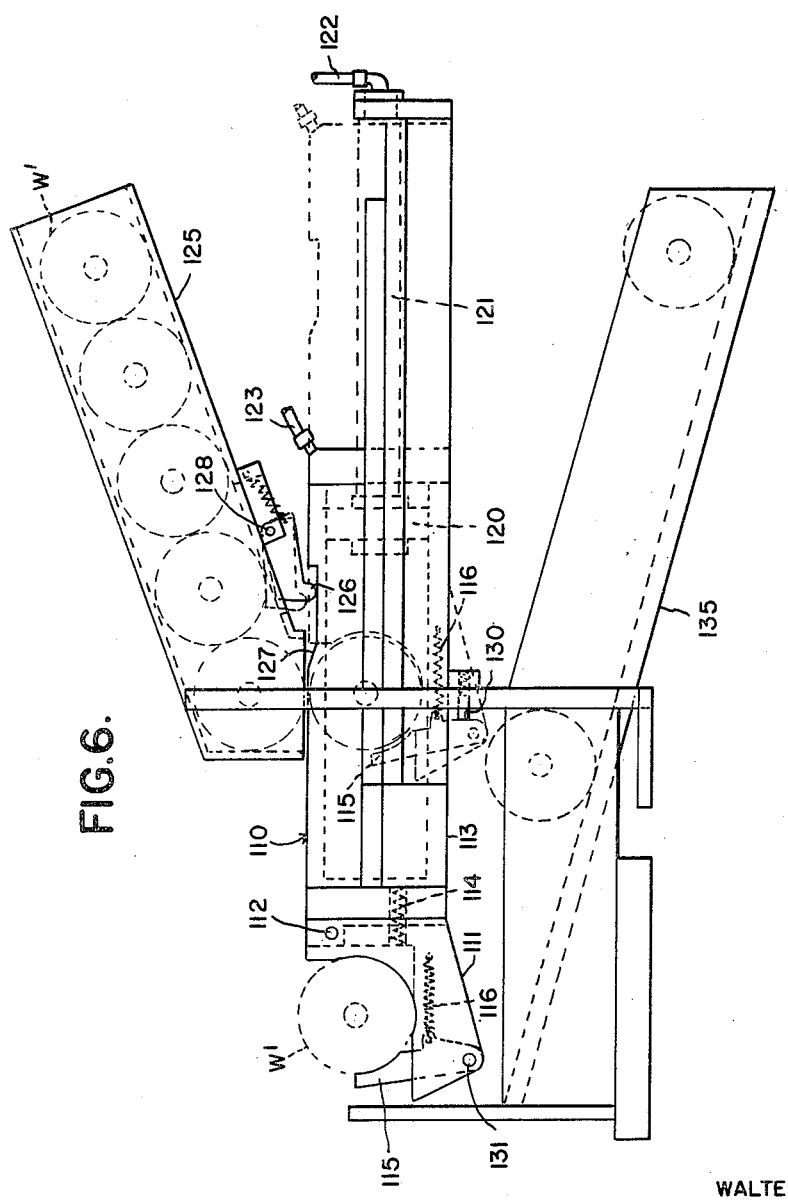
*INVENTOR.*
WALTER S. PRAEG
BY Whittemore, Hulbert
& Belknap ATTORNEYS Patented Oct. 26, 1954

2,692,535

UNITED STATES PATENT OFFICE 2,692,535

AUTOMATIC LOADING FIXTURE

Walter S. Praeg, Detroit, Mich., assignor to National Broach & Machine Company, Detroit, Mich., a corporation of Michigan Application April 12, 1948, Serial No. 20,504

17 Claims. (Cl. 90—1.6)

The present invention relates to an automatic loading fixture. In providing automatic loading means for gear finishing tools, one of the most difficult problems to solve is the manner in which the teeth of a work gear and a gear-like finishing tool can be brought into proper mesh. Briefly described, this is accomplished by supporting a gear for rotation about its axis, moving it into proper position to mesh with a gear-like cutter along a path which is substantially tangentially related to the gear and cutter, and at the same time applying a braking resistance to rotation to the work gear. The mechanism which supports the work gear is constructed and arranged to permit limited movement of the gear out of the aforesaid tangential path in the event that the teeth of the gear and tool do not initially mesh. However, due to the braking resistance, additional tangential movement between the gear and the tool positively insures that the teeth of the gear and tool will come into proper mesh.

With the foregoing general description in mind, it is an object of the present invention to provide an automatic loading fixture for transporting a series of work gears from a loading chute or the like to working position along a path which is tangentially related to the work gear and a gear-like finishing tool with which the work gear is to be meshed, and permitting rotation of the work gear while applying a brake to resist its rotation.

It is a further object of the present invention to provide an automatic loading fixture for a gear finishing machine arranged to insure proper meshing between work gears and a gear-like finishing tool.

It is a further object of the present invention to provide a loading fixture for a gear finishing machine having gear supporting means movable to engage and release a work gear in working position, a chute for receiving a plurality of unfinished work gears, a loader for transporting the work gears one at a time to working position and for bringing them into proper mesh thereat with a gear-like finishing tool, means for causing said work supporting means to engage the work gear, means for returning said loader to the chute to receive a second work gear, and means for causing said work gear supporting means to release a finished work gear at the conclusion of the machining operation.

Other objects and features of the invention will become apparent as the description proceeds, especially when taken in conjunction with the accompanying drawings, wherein:

Figure 1 is a side elevation of an automatic gear loading fixture.

Figure 1A is a fragmentary plan view showing a construction of discharge rails designed to interrupt the flow of oil.

Figure 2 is a plan view of the fixture shown in Fig. 1.

Figure 3 is a detailed view illustrating the means for supporting a work gear in working position.

Figure 6 is a side elevation illustrating a slightly different embodiment of the present invention.

Figure 4:
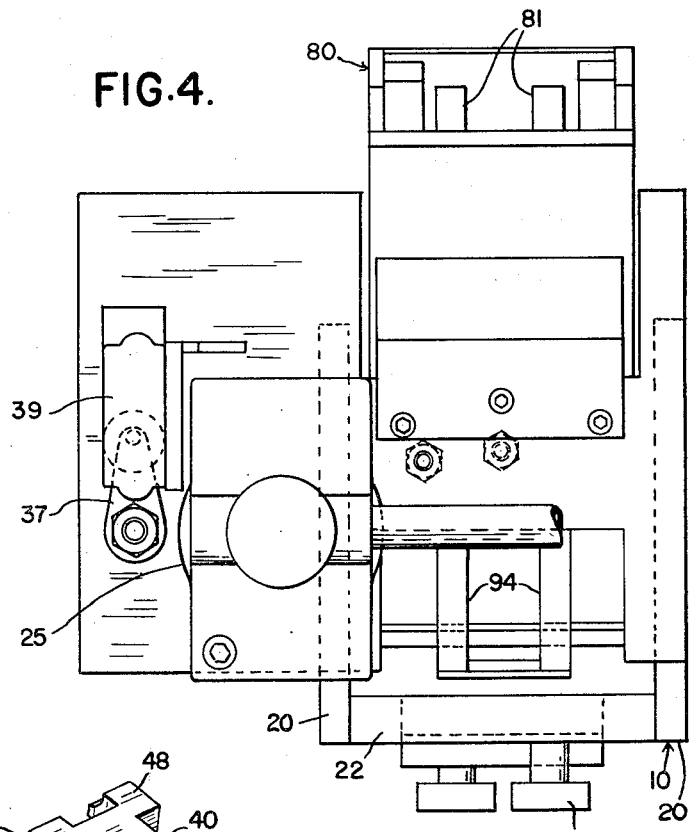
Figure 4 is an end view of the gear loading fixture looking to the left of Figure 2.
Figure 5:
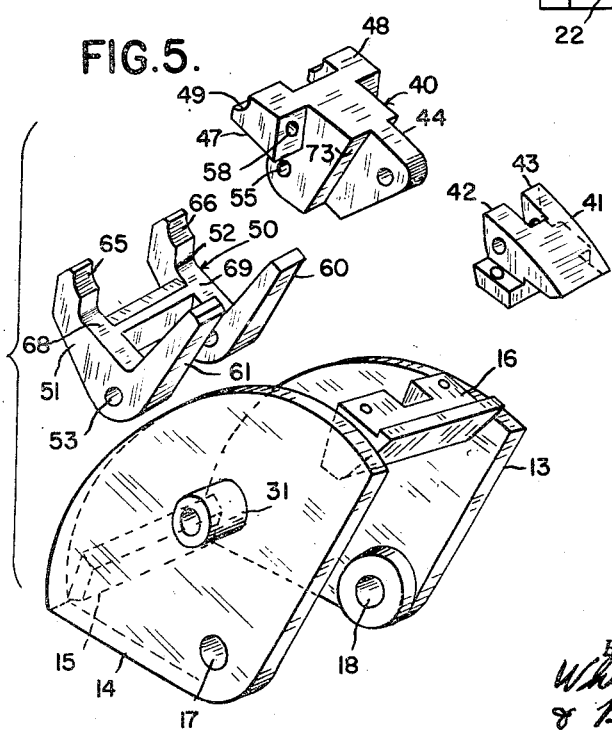
Figure 5 is an exploded view illustrating the movable loader including the gear supporting member and the brake therefor.

Referring now to Figures 1–5, the gear loading fixture is designed for attachment to a gear finishing machine of the type illustrated in my copending application Serial Number 783,796, filed November 3, 1947, Patent No. 2,635,507 issued April 21, 1953, although it is adapted for use with any gear finishing machine including shaving machines and lapping machines and machines designed for finishing gears with diagonal traverse as well as machines designed for finishing gears with axial traverse. Gear finishing machines of these types comprise means for supporting a gear-like finishing tool for rotation, means for driving the tool in rotation, and in addition they comprise means for supporting a work gear in mesh with the gear-like finishing tool, the work support and the tool support being angularly adjustable so as to provide for meshing the work gears with the gear-like tool with their axes crossed. Means are provided for effecting relative traverse between the work gear and the tool in a plane which is parallel to the axes of both the gear and tool, the direction of traverse in such plane being so related to the axes of the gear and tool that it causes the finishing action of the tool to be distributed from end to end of the teeth of the gear. If desired, means may be included for effecting a relative rocking motion between the gear and the tool so as to produce crowned teeth.

The present automatic loading fixture is designed to be supported upon the part of the machine which carries the work gear supporting members. The work gear supporting members may be centers or plugs which are movable into engagement with the gear or with a shaft or arbor on which the gear is mounted.

The loading fixture comprises a supporting frame indicated generally at 10 upon which is mounted a movable loader 12. As best seen in Figures 1-5, the loader 12 comprises a pair of spaced plates 13 and 14 interconnected by cross pieces 15 and 16 and having openings therethrough indicated at 17 and 18 for receiving a pin 19 by means of which the loader 12 is mounted for rocking movement about the horizontal axis of the pin 19 on the stationary frame 10. The pin 19 is supported in openings provided in a pair of upstanding plates 20 extending upwardly from a bed portion 22 of the frame 10.

Means are provided for rocking the loader 12 between a work receiving position and work loading position determined by suitable stop means such as screw 23 which is engaged by cross piece 15. This means may be any desired device but is herein illustrated as comprising an air cylinder 25 containing a piston to which is connected a piston rod 26. At the outer end of the piston rod 26 is a bracket 27 having apertured ears 28 for pivotally supporting a link 29 which in turn has a pivot connection with the loader 12 provided by a pivot pin 30 having a threaded portion received in a boss 31 formed at one side on the plate 14.

The bracket 27 has a laterally projecting arm 35 to which is connected one end of a push rod 36, the opposite end of the push rod being provided with a switch actuating element 37. Suitably mounted on the supporting frame 10 are a pair of microswitches 38 and 39 which are wired into the control circuit for the gear finishing machine as will subsequently be described.

The loader 12 has pivoted thereto a work gear supporting block or jaw 40. Secured to the cross piece 16 is a block 41 having a pair of forwardly projecting apertured ears 42 and 43. The gear supporting member is provided with a rearwardly extending apertured tongue 44 which is received in the slot provided between the ears 42 and 43 so that the apertures in the tongue and ears are aligned to receive a pivot pin 45. A compression spring 46 is provided between the cross piece 16 and the work supporting block 40 and urges it in a clockwise direction about the axis of the pivot pin 45 as seen in Figure 1.

The gear supporting block 40 is provided with a pair of forwardly extending gear supporting ears or portions 47 and 48 each of which is provided with a rounded seat portion 49 which is adapted to support a shaft or arbor S of the work gear W and to extend slightly beyond its vertical center line. Thus with the parts in the loading position illustrated in Figure 1, the gear W is completely supported by the block 40 even though additional means are present assisting in holding the gear W on the seat 49.

Pivoted to the work gear supporting block 40 is a brake member or auxiliary jaw 50 which is provided with a pair of arms 51 and 52 each of which has formed therein an opening 53 for receiving a pivot pin 54 which in turn passes through an aligned opening 55 formed adjacent the lower portion of the block 40. The rear surface of one or both of the gear supporting ears or portions 47 or 48 is provided with a recessed spring seat 58 which receives a compression spring 59, the opposite end of which bears against the corresponding one of the arms 60 or 61 formed on the brake member 50. This has the effect of biasing the brake member 50 in a clockwise direction as seen in Figure 1 about the axis of the pin 54. The arms 51 and 52 of the brake member 50 at their forward ends are provided with rounded portions 65 and 66 which are caused to press against the surface of the shaft S so as to apply a braking action thereto. The brake member 50 is permitted limited pivotal motion about the axis 54, this motion being limited in a counterclockwise direction as seen in Figure 1 by engagement between the arms 60 and 61 and the rear surface of the gear supporting ears or portions 47 and 48. Its motion in the opposite direction is limited by engagement between its surfaces 68 and 69 with the under surfaces of the gear supporting ears or portions 47 and 48 of the block 40. Motion of the block 40 about its pivot axis 45 is limited in a counterclockwise direction as seen in Figure 1 by engagement between the rear surface of the tongue 44 with the forward surface of the cross piece 16. Motion of the block 40 in a clockwise direction about its supporting pivot pin 45 is limited by engagement between shoulders 73 with the forward surfaces of the ears 42 and 43 of the block 41. At this time the gear supporting jaw 40 is in position to support the work gear W in fully meshed relation to a gear-like finishing tool T when the loader is moved to loading position.

The frame 10 includes a loading chute 80 which is designed with particular reference to the gear to be finished. In this particular instance the gear to be finished includes a short shaft or arbor S and the chute 80 is designed to provide inclined rails 81 along which the shafts S roll. At its lower end the chute 80 provides a more abruptly inclined passage 82 for the gears from which passage the gears drop by gravity into the space between the jaw 40 and the auxiliary jaw 50. In order to insure accuracy in locating an unfinished gear member as it drops from the chute into the loader, means are provided for automatically opening the jaws as the loader moves to gear receiving position. This means comprises an adjustable abutment screw 85 which is positioned to engage one of the arms 60 or 61 near its top upon movement of the loader to gear receiving position. As the loader then moves to loading position, the compression spring 59 causes the auxiliary jaw member 50 to close, assisting in retaining the shaft S on the seat 49 provided in the main jaw 40 and also providing a predetermined braking action to resist rotation of the gear W.

The parts are constructed and arranged such that the teeth of the gear W are moving in a path tangentially related to the gear W and the tool T when they come into engagement with the teeth of the tool. In the event that the teeth of the gear W and the tool T do not initially mesh when they come into contact, the gear is permitted to move slightly from the tangential path referred to, this motion taking place as a result of a pivot motion of the main jaw 40 and auxiliary jaw 50 about the pivot pin 45. This motion is of course resisted by the compression spring 46 which continues to urge the gear toward a meshing position with the tool T. In a machine of this type the tool T is normally stationary during loading and is connected through a driving train of gears to a motor so that it is effectively held against rotation. However the loading attachment is operative even though the cutting tool may not have come completely to rest before engagement between the work gear and the cutter. Since rotation of the work gear W is resisted by the braking action of the auxiliary jaw 50, further rotation of the loader insures that the teeth of the gear and tool come into proper mesh.

Referring now to Figure 3, the work gear W is shown as supported by its shaft S between the jaws 40 and 50. At this time automatic means such as air cylinders indicated at C are provided for advancing one or both of centers 85 and 86 into engagement with recesses provided in the ends of the shaft or arbor S. The means for initiating forward movement of the centers 85 and 86 into engagement with the work will include the microswitch 38 which will be actuated when the loader has moved the work gear into position to mesh fully with the tool. When the centers have engaged and are supporting the work gear the loader 12 is retracted by operation of the air cylinder 25. During this retracting movement the upper surface of the block 41 constitutes a shoe which prevents downward movement of the next succeeding work gear to the chute 80 until such time as the space between the jaws 40 and 50 is in registry with the discharge outlet from the chute. At this time as previously described, the auxiliary jaw 50 will be swung to open position so that the work gear may drop completely into the seat 49 provided in the jaw 40.

Suitable means are provided which are responsive to completion of the inward movement of the centers 85 and 86 for initiating movement of the loader from loading position to work receiving position. As the loader reaches work receiving position the actuator 37 trips the limit switch 39 which may be connected into the control circuit for the gear finishing machine to initiate operation of the gear finishing cycle such for example as starting rotation of the tool T and initiating relative traverse between the gear and tool.

If desired, additional means may be provided for insuring proper centering of the gear W prior to inward motion of the centers 85 and 86. For this purpose a centering bracket 90 may be provided on the upstanding plates 20, the bracket having inwardly directing fingers 91 between which the gear W will enter.

The support comprising plates 20 is also provided with discharge means comprising a pair of rails 94. At the completion of a gear finishing operation the centers 85 and 86 retract and the finished gear drops by gravity onto the rails 94 on which it rolls and may drop into a suitable receptacle which may be located beneath the delivery end of the rail.

The complete attachment is adapted to be secured to suitable T slots indicated at 95 formed in the work supporting table 96 and is clamped therein by T bolts 97. Accordingly, the entire fixture is detachable and may be removed when its use is not required. However, the use of the fixture greatly increases the potential output of the machine since the unloading and loading cycle is reduced to a very brief interval. It is necessary for the operator only to see that the loading chute 80 contains unfinished gears and to remove finished gears from the receptacle.

It may be mentioned that the gear finishing machine for which the attachment is designed has means responsive to completion of inward movement of the centers 85 and 86 to initiate the next succeeding operation. Thus if for any reason the work gear W is not brought into accurately meshed relationship with the tool the centers will be prevented from reaching their designed operating position and further operation of the machine will be terminated until the difficulty has been corrected.

Referring now to Figure 6 there is illustrated a specifically different embodiment of the present invention. In this case the gears W' are not provided with shafts or arbors but instead are designed to be engaged by plugs on head or tail stocks otherwise identical with the center supporting head stocks in the embodiment previously described. In this case, the loader 110 is designed for straight line back and forth reciprocation instead of for rocking movement. Otherwise it contains elements generally similar in design and function with the elements of the previously described embodiment. More particularly, the loader has at its forward end a principal work gear supporting jaw 111 which is pivoted as indicated at 112 to the slide 113 and which is urged by a compression spring 114 into its normal gear supporting position. Adjacent the forward end of the principal jaw member 111 is an auxiliary jaw or brake member 115 which is urged by a tension spring 116 into engagement with the periphery of a work gear W'. The brake element 115 retains the work gear W' in proper position and at the same time offers frictional resistance to its rotation.

The means for reciprocating the slide 113 comprises a stationary piston 120 carried by a hollow piston rod 121 through which pressure fluid is admitted from the conduit 122. The slide 113 comprises a cylinder movable with respect to the piston and carries a conduit 123 for the admission and exhaust of pressure fluid from the side of the piston opposite to that at which fluid is admitted from the conduit 122.

Unfinished gears are provided in an inclined delivery chute 125 which contains a pivoted retainer 126. The upper surface of the slide 113 is provided with a camming notch 127 and the retainer 126 is pivoted as indicated at 128 and is spring biased toward a position in which it permits passage of gears therepast. When the slide 113 is in its loading or forward position, as illustrated in the full line position of Figure 6, the retainer is in its lowermost or full line position and will permit the passage of an additional gear into position to be dropped into the jaws when the loader 110 is next moved to work receiving position. However, as the loader moves to work receiving position, the retainer is cammed upwardly to its dotted line position and will retain the second work gear in the chute until the loader is again moved forwardly to loading position.

Means are provided for mechanically opening the auxiliary jaw or brake 115 as the loader moves to work receiving position. For this purpose an adjustable abutment pin 130 is provided which engages the member 115 slightly above its pivot point 131 so as to move it away from the principal jaw member 111.

When the work gear W' is moved tangentially into mesh with a tool the principal jaw member 111 may pivot slightly about its pivot pin 112 in the event that the teeth of the gear and tool do not come into proper mesh. However, rotation of the gear W' is resisted by the brake member 115 so that additional movement of the loader toward loading position will insure proper meshing between the gear and tool. At this time a suitable limit switch (not shown but similar in design and function to the limit switch 38) will cause the work supporting head stock and tail stock to move inwardly to engage the work piece after which the loader is moved to work receiving position. Movement of the loader to work receiving position is accompanied by a swinging movement of the brake arm 115 through a substantial arc so as to clear the work piece, this movement being permitted by the extension of the spring 116.

In this loading fixture an inclined discharge chute 135 is provided in position to receive the finished gears W', which roll down the chute and drop into a suitable receptacle.

Where the automatic loading fixture is employed with a gear shaving machine, the cutting operation of the gears is carried out in a bath of oil. It is desirable to prevent flow of oil down the discharge rails 94 or 135. A construction designed to prevent this flow of oil is illustrated in Figure 1A which represents a fragmentary plan view looking downward on one of the discharge rails 94. As seen in this figure the rail 94 may if desired terminate inside a front plate on the machine, such as shown at P, which operates as an oil shield. In this case a second pair of discharge rails, one of which is illustrated at 98 in Figure 1A, is provided. Rail sections 98 are supported from rail sections 94 as by connector elements (not shown) fastened by supporting screws indicated at 99. The adjacent ends of the rail sections 94 and 98 are preferably spaced apart by a substantial distance and in order to provide for free rolling of the finished gears down these rails the adjacent ends are preferably beveled with their angled corners in overlapping relationship longitudinal of the rail structure as shown. This causes oil which may be flowing in considerable quantities down rail sections 94 to flow off the beveled end of rail section 94 so that no oil flows across the gap between the adjacent ends of the rail sections 94 and 98.

The drawings and the foregoing specification constitute a description of the improved automatic loading fixture in such full, clear, concise and exact terms as to enable any person skilled in the art to practice the invention, the scope of which is indicated by the appended claims.

What I claim as my invention is:

1. In a machine for finishing gears, a toothed part with which the teeth of the work gears are to be engaged, work supporting means movable to engage and to release work gears, a work loader movable between work receiving and loading positions, along a path which moves the teeth of a work gear tangentially into engagement with the teeth of said toothed part, said loader shaped to support work gears for rotation about their axes and including brake means to resist rotation thereof and to insure meshing with said toothed part, yieldable means urging the work gears toward the tool, and means to actuate said work supporting means to engage a work piece after it has reached working position and is fully meshed with said toothed part.

2. In a loading fixture for a gear finishing machine having a gear-like finishing tool with which a plurality of work gears are to be meshed, a loader movable back and forth between work-receiving and loading positions along a path which causes the teeth of the work gear and tool to approach tangentially, a work gear carrying member movably mounted on said loader to provide for limited movement of a work gear out of said path if the teeth of the gear and tool fail to mesh on initial contact, said member supporting a work gear for axial rotation, and brake means connected to said member and movable therewith relative to said loader resisting rotation of a work gear to insure meshing of a gear and said tool, said brake means including a spring pressed element engageable directly with the work gear on said member to offer frictional resistance to rotation of said work gear.

3. In a loading fixture for a gear finishing machine having a gear-like finishing tool with which a plurality of work gears are to be meshed, a loader movable back and forth between work-receiving and loading positions along a path which causes the teeth of the work gear and tool to approach tangentially, a work gear carrying member movably mounted on said loader to provide for limited movement of a work gear out of said path if the teeth of the gear and tool fail to mesh on initial contact, said member supporting a work gear for axial rotation, and brake means connected to said member and movable therewith relative to said loader resisting rotation of a work gear to insure meshing of a gear and said tool, said brake means comprising a spring pressed element engageable with the side of said gear toward which said loader moves in moving from work receiving to loading position and being movable through a wide arc to disengage a work gear upon return movement of said loader from loading to work-receiving position.

4. In a machine for finishing gears, a toothed part with which the teeth of the work gears are to be engaged, work supporting means movable to engage and to release work gears, a work loader movable between work receiving and loading positions along a path which moves the teeth of a work gear tangentially into engagement with the teeth of said toothed part, said loader having a gear supporting member underlying and extending just slightly beyond vertical center line of the work gear which it engages and on which said work gear is rotatable, said member being movable on said loader to provide for limited movement of the member and work gear carried thereby out of said path in a direction away from the tool, and brake means resisting rotation of a work gear carried thereby.

5. In a machine for finishing gears, a toothed part with which the teeth of the work gears are to be engaged, work supporting means movable to engage and to release work gears, a work loader movable between work receiving and loading positions along a path which moves the teeth of a work gear tangentially into engagement with the teeth of said toothed part, said loader having a gear supporting member underlying and extending just slightly beyond vertical center line of the portion of the work gear which it engages and on which said work gear is rotatable, said member being movable on said loader to provide for limited movement of the member and work gear carried thereby out of said path in a direction away from the tool, and brake means resisting rotation of a work gear carried thereby, said brake means comprising a spring pressed element bearing against a work gear on said member in a direction retaining the gear on said member.

6. In a machine for finishing gears, a toothed part with which the teeth of the work gears are to be engaged, work supporting means movable to engage and to release work gears, a work loader movable between work receiving and loading positions, along a path which moves the teeth of a work gear tangentially into engagement with the teeth of said toothed part, said loader having a gear supporting member underlying and extending just slightly beyond vertical center line of the portion of the work gear which it engages and on which said work gear is rotatable, said member being movable on said loader to provide for limited movement of the member and work gear carried thereby out of said path in a direction away from the tool, and brake means resisting rotation of a work gear carried thereby, said brake means comprising a spring pressed element bearing against a work gear on said member in a direction retaining the gear on said member, and being movable relative to said member to release the work gear upon return of said loader to gear-receiving position.

7. In a loading fixture for a gear finishing machine having a gear-like tool with which a plurality of work gears are to be meshed, a loader movable from work-receiving to loading position along a path which causes the teeth of a work gear carried thereby to approach tangentially the teeth of the tool, a work gear carrying member pivoted to said loader and having a portion underlying and extending just beyond vertical center line of the portion of the work gear which it engages and on which said gear is rotatable, resilient means urging said member to a position in which the work gear is moved to fully meshed relation with the tool but providing for limited displacement of said member if the teeth of the gear and tool fail to mesh on initial engagement, a spring pressed brake normally retaining the gear on said portion of said member.

8. In a loading fixture for a gear finishing machine having a gear-like tool with which a plurality of work gears are to be meshed, a loader movable from work-receiving to loading position along a path which causes the teeth of a work gear carried thereby to approach tangentially the teeth of the tool, a work gear carrying member pivoted to said loader and having a portion underlying and extending just beyond vertical center line of the portion of the work gear which it engages and on which said gear is rotatable, resilient means urging said member to a position in which the work gear is moved to fully meshed relation with the tool but providing for limited displacement of said member if the teeth of the gear and tool fail to mesh on initial engagement, a spring pressed brake normally retaining the gear on said portion of said member, said brake being movable to clear the work gear upon return movement of said loader.

9. An automatic loading fixture for a gear finishing machine of the type having a gear-like finishing tool, means for driving said tool, and a rotary work support including means for engaging a work gear when said gear is in meshed relation with the gear-like tool: said fixture comprising a carriage movable back and forth between limiting positions, a gear carrier on said carriage in position to advance a gear tangentially into mesh with the tool, said carrier comprising a pair of relatively movable jaws yieldable as a unit relative to said carriage transversely of the path of back and forth movement of said carriage, said jaws engaging a work gear to permit rotation of the gear as it is brought into mesh with the tool.

10. A fixture as defined in claim 9 including spring means urging said carrier toward the tool.

11. Automatic gear finishing apparatus comprising a rotary tool support for a rotary gear-like cutter adapted to rotate in mesh with a roughed-out work gear, work support means including a pair of members relatively movable toward and away from each other to grip and release a work gear when the work gear is in mesh in cutting position with a gear-like cutter, a carriage, means on said carriage for supporting a work gear for rotation about its axis, means for advancing said carriage along a path such that the gear normally approaches the cutter tangentially and meshes therewith, means providing for movement of the work gear relative to said carriage in a direction generally perpendicular to the path of advance of said carriage and away from the cutter upon failure of the work gear and cutter to mesh on initial contact, and means for causing relative approach between said pair of members to grip the work gear upon proper meshing thereof with the cutter.

12. Apparatus as defined in claim 11 which comprises resilient means on said carriage operable to oppose movement of the work gear away from the cutter and to move the work gear into mesh with the cutter when the teeth of the gear and cutter permit.

13. Apparatus as defined in claim 12 which comprises brake means on said carriage operable to oppose rotation of the work gear so as to insure meshing of the work gear and cutter during advance of said carriage.

14. Apparatus for performing operations on rotary gears comprising a rotary support for a gear-like member adapted to rotate in mesh at accurately predetermined center distance with a rotary work gear, work support means comprising a pair of members relatively movable toward each other to grip and support a work gear for rotation in accurately centered relation with respect thereto while the work gear is in mesh with the gear-like member, and movable away from each other to release the work gear, means for advancing the gear along a path such that the peripheral portion of the gear approaches the peripheral portion of the gear-like member generally tangentially with the teeth of the gear and gear-like member in overlapping relation, said means being constructed and arranged to provide for rotation of the gear as it meshes with the gear-like member and to provide for movement of the gear in a direction generally perpendicular to said path and away from the gear-like member upon failure of the gear and gear-like member to mesh on initial contact, means for causing approach of said pair of members to grip the gear upon proper meshing thereof with the gear-like member, means for rotating the gear and gear-like member in mesh, and means for separating said pair of members to release the gear upon completion of the operation.

15. Apparatus of the character described comprising a rotary tool support for a rotary gear-like tool adapted to rotate in mesh with a work gear, work support means movable to engage and support a work gear for rotation in accurately located position in mesh with a gear-like tool and reversely movable to release the work gear, a carriage, releasable means on said carriage for supporting a work gear for rotation, means for advancing said carriage along a path such that the gear normally approaches the gear-like member generally tangentially with the teeth of the gear and gear-like member in overlapping relation, the means on said carriage being constructed and arranged to provide for movement of the work gear out of its normal path of advance in a direction away from the gear-like member upon failure of the work gear and gear-like member to mesh on initial contact, means for moving said work support means to engage the work gear when the work gear is meshed with said gear-like member, means for thereafter retracting said carriage to leave the work gear engaged by said work support means for rotation in mesh with the gear-like member, means for rotating said work gear and gear-like member in mesh, and means for reversely moving said work support means to release the work gear.

16. A loading fixture for a gear finishing machine of the type having a gear-like tool for operation in mesh with a gear to be finished, a loader having gear supporting means thereon, means for reciprocating said loader in a path causing the teeth of the gear and tool to approach tangentially, said gear supporting means being located beneath the tool, and being movable downwardly relative to said loader, and resilient means engaging said gear supporting means and opposing downward motion thereof, said resilient means thus urging the work gear upwardly with a force representing the difference between the force of said spring and the weight of the gear.

17. Apparatus of the character described comprising a rotary tool support for a rotary gear-like tool adapted to rotate in mesh with a work gear at accurately controlled center distance, work support means movable to engage a work gear and to support it for rotation in accurately located position in mesh with the gear-like tool, a carriage for advancing a work gear into peripheral engagement with the tool with provision for rotation of the gear during advance and for bodily shifting movement relative to said carriage if the teeth of the gear and tool fail to mesh on initial contact, means for moving said work support means to engage the work gear following meshing thereof with the tool, means for retracting said carriage while the gear is supported by said work support means, means for rotating the gear and tool in mesh, and means for thereafter reversely moving the work support means to release the gear.

References Cited in the file of this patent

UNITED STATES PATENTS

| Number | Name | Date |
|---|---|---|
| 321,698 | Eberhardt | July 7, 1885 |
| 366,592 | Marsh et al. | July 12, 1887 |
| 406,466 | Place | July 9, 1889 |
| 497,493 | Dayton | May 16, 1893 |
| 921,717 | Landis | May 18, 1909 |
| 1,174,349 | Reynolds | Mar. 7, 1916 |
| 1,273,902 | Muller | July 30, 1918 |
| 1,502,671 | Hillmer et al. | July 29, 1924 |
| 2,157,981 | Drummond | May 9, 1939 |
| 2,382,013 | King | Aug. 14, 1945 |
| 2,389,083 | Rosengren | Nov. 13, 1945 |
| 2,390,533 | Hill | Dec. 11, 1945 |

FOREIGN PATENTS

| Number | Country | Date |
|---|---|---|
| 713,102 | France | Aug. 10, 1931 |